(12) United States Patent
Fukushima (10) Patent No.: US 8,966,202 B2
(45) Date of Patent: Feb. 24, 2015

(54) WIRELESS COMMUNICATION DEVICE

(75) Inventor: Keito Fukushima, Tokyo (JP)

(73) Assignee: Olympus Corporation, Tokyo (JP)

( * ) Notice: Subject to any disclaimer, the term of this patent is extended or adjusted under 35 U.S.C. 154(b) by 152 days.

(21) Appl. No.: 13/438,064

(22) Filed: Apr. 3, 2012

(65) Prior Publication Data

US 2012/0272028 A1 Oct. 25, 2012

(30) Foreign Application Priority Data

Apr. 4, 2011 (JP) ................................ 2011-082775

(51) Int. Cl.
*G06F 12/14* (2006.01)
*H04W 12/00* (2009.01)
*H04W 4/00* (2009.01)
*H04L 29/08* (2006.01)

(52) U.S. Cl.
CPC ............... *G06F 12/14* (2013.01); *H04W 12/00* (2013.01); *G06F 12/1416* (2013.01); *H04W 4/008* (2013.01); *H04L 67/1097* (2013.01); *H04L 29/08045* (2013.01); *H04L 29/08054* (2013.01)
USPC ... 711/163; 711/164; 340/10.01; 340/539.01; 370/278; 370/328; 370/329; 370/419; 370/431

(58) Field of Classification Search
CPC .... G06F 12/14; G06F 12/1416; H04W 12/00; H04L 67/1097; H04L 29/08045; H04L 29/08054
USPC .......... 711/162, 163, 164; 340/10.01, 539.01; 370/278, 328, 329, 419, 431
See application file for complete search history.

(56) References Cited

U.S. PATENT DOCUMENTS

| 2004/0243990 | A1 | 12/2004 | Noda et al. |
| 2006/0288180 | A1 | 12/2006 | Shih et al. |
| 2007/0149190 | A1* | 6/2007 | Matsuhashi ................ 455/432.1 |
| 2008/0189775 | A1* | 8/2008 | Fujita ................................. 726/7 |
| 2009/0040648 | A1* | 2/2009 | Imai ................................ 360/71 |

FOREIGN PATENT DOCUMENTS

| JP | 6-090427 A | 3/1994 |
| JP | 2003-216902 A | 7/2003 |
| JP | 2008-090949 A | 4/2008 |
| JP | 2010-237772 A | 10/2010 |
| JP | 2010-258595 A | 11/2010 |

OTHER PUBLICATIONS

Japanese Notice of Allowance dated Nov. 25, 2014, issued in corresponding Japanese Patent Application No. 2011-082775; w/English Translation (6 pages).

* cited by examiner

*Primary Examiner* — Reginald Bragdon
*Assistant Examiner* — Mehdi Namazi
(74) *Attorney, Agent, or Firm* — Westerman, Hattori, Daniels & Adrian, LLP (57) ABSTRACT

In this wireless communication device, a storage unit stores writing identification information relating to permission and prohibition of writing. An acquisition unit acquires device identification information that uniquely specifies an arbitrary wireless communication device from the arbitrary wireless communication device. A determination unit determines permission or prohibition of writing to a recording medium on the basis of the device identification information acquired by the acquisition unit and the writing identification information stored in the storage unit when a communication protocol of a session layer that performs writing to and readout from the recording medium in sector units is selected. A recording medium control unit controls permission and prohibition of writing to the recording medium on the basis of a result determined by the determination unit.

6 Claims, 11 Drawing Sheets

| FIELD | DESCRIPTION |
|---|---|
| MESSAGE TYPE | MESSAGE TYPE (REQUEST MESSAGE OR RESPONSE MESSAGE) |
| MESSGAE CODE | IDENTIFICATION CODE OF MESSAGE CLASS |
| RESPONSE CODE | RESPONSE CODE |
| PARAMETERS | PARAMETERS DEFINED ACCORDING TO EACH MESSAGE CLASS |
| LENGTH | SIZE OF DATA FIELD |
| DATA | DATA DEFINED ACCORDING TO EACH MESSAGE CLASS |

FIG. 7

| FIELD | DESCRIPTION |
|---|---|
| MESSAGE TYPE | MESSAGE TYPE (=REQUEST MESSAGE) |
| MESSGAE CODE | IDENTIFICATION CODE OF MESSAGE CLASS (=GET DEVICE INFORMATION) |
| RESPONSE CODE | RESPONSE CODE (=0:INVALID) |
| PARAMETERS | PARAMETER (=0:NO PARAMETER) |
| LENGTH | SIZE OF DATA FIELD |
| DATA | DEVICE INFORMATION |
| VENDOR ID | VENDOR ID |
| PRODUCT ID | PRODUCT ID |
| VENDOR NAME | VENDOR NAME |
| PRODUCT NAME | PRODUCT NAME |

FIG. 8

| FIELD | DESCRIPTION | |
|---|---|---|
| MESSAGE TYPE | MESSAGE TYPE (=RESPONSE MESSAGE) | |
| MESSGAE CODE | IDENTIFICATION CODE OF MESSAGE CLASS (=GET DEVICE INFORMATION) | |
| RESPONSE CODE | RESPONSE CODE (=SUCCESS) | |
| PARAMETERS | PARAMETER (=0:NO PARAMETER) | |
| LENGTH | SIZE OF DATA FIELD | |
| DATA | DEVICE INFORMATION | |
| | VENDOR ID | VENDOR ID |
| | PRODUCT ID | PRODUCT ID |
| | VENDOR NAME | VENDOR NAME |
| | PRODUCT NAME | PRODUCT NAME |

FIG. 9

| FIELD | DESCRIPTION |
|---|---|
| MESSAGE TYPE | MESSAGE TYPE (=REQUEST MESSAGE) |
| MESSGAE CODE | IDENTIFICATION CODE OF MESSAGE CLASS (=GET SERVICE LIST) |
| RESPONSE CODE | RESPONSE CODE (=0:INVALID) |
| PARAMETERS | PARAMETER (=0:NO PARAMETER) |
| LENGTH | SIZE OF DATA FIELD (=0) |
| DATA | NONE (NO DATA) |

FIG. 10

| FIELD | DESCRIPTION |
|---|---|
| MESSAGE TYPE | MESSAGE TYPE (=RESPONSE MESSAGE) |
| MESSGAE CODE | IDENTIFICATION CODE OF MESSAGE CLASS (=GET SERVICE LIST) |
| RESPONSE CODE | RESPONSE CODE (=SUCCESS) |
| PARAMETERS | NUMBER OF SERVICE PARAMETERS (=m) |
| LENGTH | SIZE OF DATA FIELD |
| DATA | SERVICE PARAMETER LIST |
| SERVICE PARAMETER#0 | SERVICE PARAMETER#0 |
| SERVICE PARAMETER#1 | SERVICE PARAMETER#1 |
| ⋮ | ⋮ |
| SERVICE PARAMETER#m-1 | SERVICE PARAMETER#m-1 |

FIG. 11

| FIELD | DESCRIPTION |
|---|---|
| PROTOCOL CODE | PROTOCOL CLASS |
| CLASS CODE | CLASS CODE DEFINED ACCORDING TO EACH PROTOCOL CLASS |
| LENGTH | SIZE OF SERVICE INFORMATION |
| SERVICE INFORMATION | INFORMATION CORRESPONDING TO SERVICE OF APPLICATION LAYER |

FIG. 12

| FIELD | DESCRIPTION |
|---|---|
| MESSAGE TYPE | MESSAGE TYPE (=REQUEST MESSAGE) |
| MESSGAE CODE | IDENTIFICATION CODE OF MESSAGE CLASS (=SET SERVICE) |
| RESPONSE CODE | RESPONSE CODE (=0:INVALID) |
| PARAMETERS | PARAMETER (=0:NO PARAMETER) |
| LENGTH | SIZE OF DATA FIELD |
| DATA | SERVICE PARAMETER |
| SERVICE PARAMETER | OPERATING SERVICE PARAMETER |

FIG. 13

| FIELD | DESCRIPTION |
|---|---|
| MESSAGE TYPE | MESSAGE TYPE (=RESPONSE MESSAGE) |
| MESSGAE CODE | IDENTIFICATION CODE OF MESSAGE CLASS (=SET SERVICE) |
| RESPONSE CODE | RESPONSE CODE (=SUCCESS) |
| PARAMETERS | PARAMETER (=0:NO PARAMETER) |
| LENGTH | SIZE OF DATA FIELD (=0:NO DATA) |

WIRELESS COMMUNICATION DEVICE

BACKGROUND OF THE INVENTION

1. Field of the Invention

The present invention relates to a wireless communication device. Priority is claimed Japanese Patent Application No. 2011-082775 filed on Apr. 4, 2011 in the Japan Patent Office, the entire content of which is incorporated herein by reference.

2. Description of the Related Art

Wireless technology such as a wireless local area network (LAN) or the like has a relatively long communication range. For this reason, a device that performs communication using a wireless LAN enables communication regardless of some movement. However, short-range wireless technology such as TransferJet (registered trademark) has a communication range of about several centimeters, which is short. Thus, in a device that performs communication using short-range wireless technology, a device unintentionally moves away from a communication counterpart when, it is impossible to maintain a communication connection and perform data transmission normally.

In particular, when communication is cut off while received data is being written to a recording medium according to the small computer system interface (SCSI) standard whereby reading and writing are performed in sector units, data in the recording medium may be lost due to destruction of a file management area, and the like. Also, a configuration in which a user prohibits writing to a recording medium (write protect) by manipulating a switch that the recording medium has in order to prevent data loss has been known. This configuration has been disclosed in, for example, Japanese Unexamined Patent Application, First Publication No. H6-90427 and Japanese Unexamined Patent Application, First Publication No. 2008-90949. When such a recording medium is used, if there is a possibility of being cut off wireless communication during data writing, a user stops data writing to a recording medium by manipulating a switch that the recording medium has, thereby reducing the risk of data loss.

SUMMARY OF THE INVENTION

According to a first aspect of the present invention, a wireless communication device includes: a communication interface which is capable of communicating with an arbitrary wireless communication device; a recording medium configured to store data communicated from the arbitrary wireless communication device via the communication interface; a storage unit configured to store writing identification information relating to permission and prohibition of writing to the recording medium; an acquisition unit configured to acquire device identification information uniquely specifying the arbitrary wireless communication device from the arbitrary wireless communication device via the communication interface until communication by a communication protocol of a higher layer level than a transport layer level is started after a connection with the arbitrary wireless communication device is established by a communication protocol of the transport layer level; a determination unit configured to determine permission or prohibition of writing to the recording medium on the basis of the device identification information acquired by the acquisition unit and the writing identification information stored in the storage unit when a communication protocol of a session layer that performs writing to and readout from the recording medium in sector units is selected by the communication protocol of the higher layer level; and a recording medium control unit configured to control permission and prohibition of writing to the recording medium on the basis of a result determined by the determination unit.

According to a second aspect of the present invention, in the wireless communication device, the acquisition unit acquires the device identification information via the communication protocol of the higher layer level than the communication protocol of the transport layer level.

According to a third aspect of the present invention, in the wireless communication device, the communication protocol of the session layer that performs writing to and readout from the recording medium in sector units is an SCSI.

According to a fourth aspect of the present invention, in the wireless communication device, the determination unit determines permission or prohibition of writing to the recording medium at the same layer as the acquisition unit acquires the device identification information.

According to a fifth aspect of the present invention, in the wireless communication device, the determination unit determines permission or prohibition of writing to the recording medium before the communication protocol of the higher layer than the communication protocol of the session layer starts.

According to a sixth aspect of the present invention, in the wireless communication device, the determination unit notifies the communication protocol of the higher layer than the communication protocol of the session layer of the determination result of permission or prohibition of writing to the recording medium.

According to a seventh aspect of the present invention, in the wireless communication device, the acquisition unit acquires the device identification information before the communication protocol of the session layer is selected.

DETAILED DESCRIPTION OF THE INVENTION

Hereinafter, an embodiment of the present invention will be described with reference to the drawings. This embodiment will be described using an example of performing wireless communication between an electronic camera (wireless communication device) and a wireless communication device such as a conversion adaptor or personal computer (PC).

Figure 1:
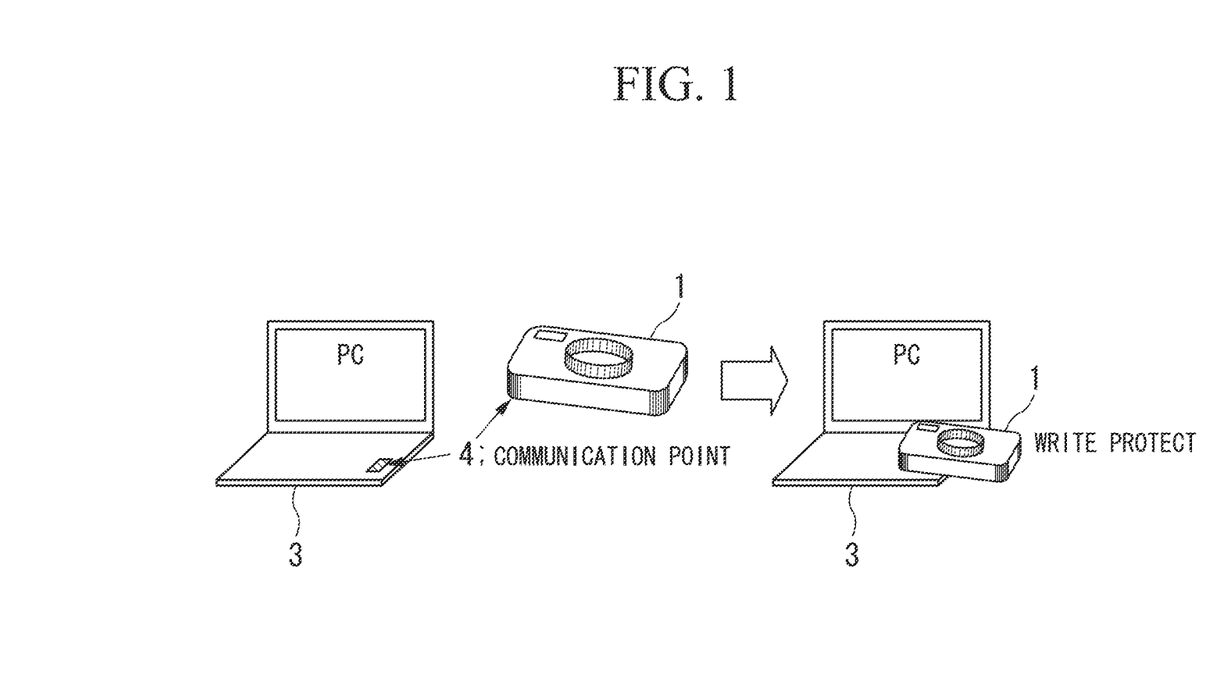
FIG. 1 is a schematic diagram showing an example of a connection when an electronic camera and a personal computer (PC) perform wireless communication according to an embodiment of the present invention.

FIG. 1 is a schematic diagram showing an example of a connection when an electronic camera and a PC perform wireless communication according to this embodiment. In the shown example, each of an electronic camera 1 and a PC 3 has a communication point 4. By matching positions of the communication points 4 of the electronic camera 1 and the communication points 4 of the PC 3 with each other, the electronic camera 1 and the PC 3 can perform wireless communication using short-range wireless technology. Here, the electronic camera 1 and the PC 3 perform wireless communication using short-range wireless technology. Thus, in case that a user manipulating a keyboard of the PC 3, and the like, the positions of the communication points 4 deviate from each other by a hand of the user comes in contact with the electronic camera 1, and then, wireless communication is cut off.

For example, when each of the positions of the communication points 4 of the electronic camera 1 and the communication points 4 of the PC 3 deviate from each other while the electronic camera 1 is writing data received from the PC 3 to a recording medium according to an interface standard (SCSI) whereby reading and writing are performed in sector units, wireless communication is cut off. When wireless communication is cut off, data in the recording medium may be lost due to destruction of a file management area of the recording medium, and the like. Thus, in this embodiment, writing is prohibited to the recording medium of the electronic camera 1 in case that the positions of the electronic camera 1 and a wireless communication device of a communication destination easily deviate from each other as in the combination of the electronic camera 1 and the PC 3.

Figure 2:
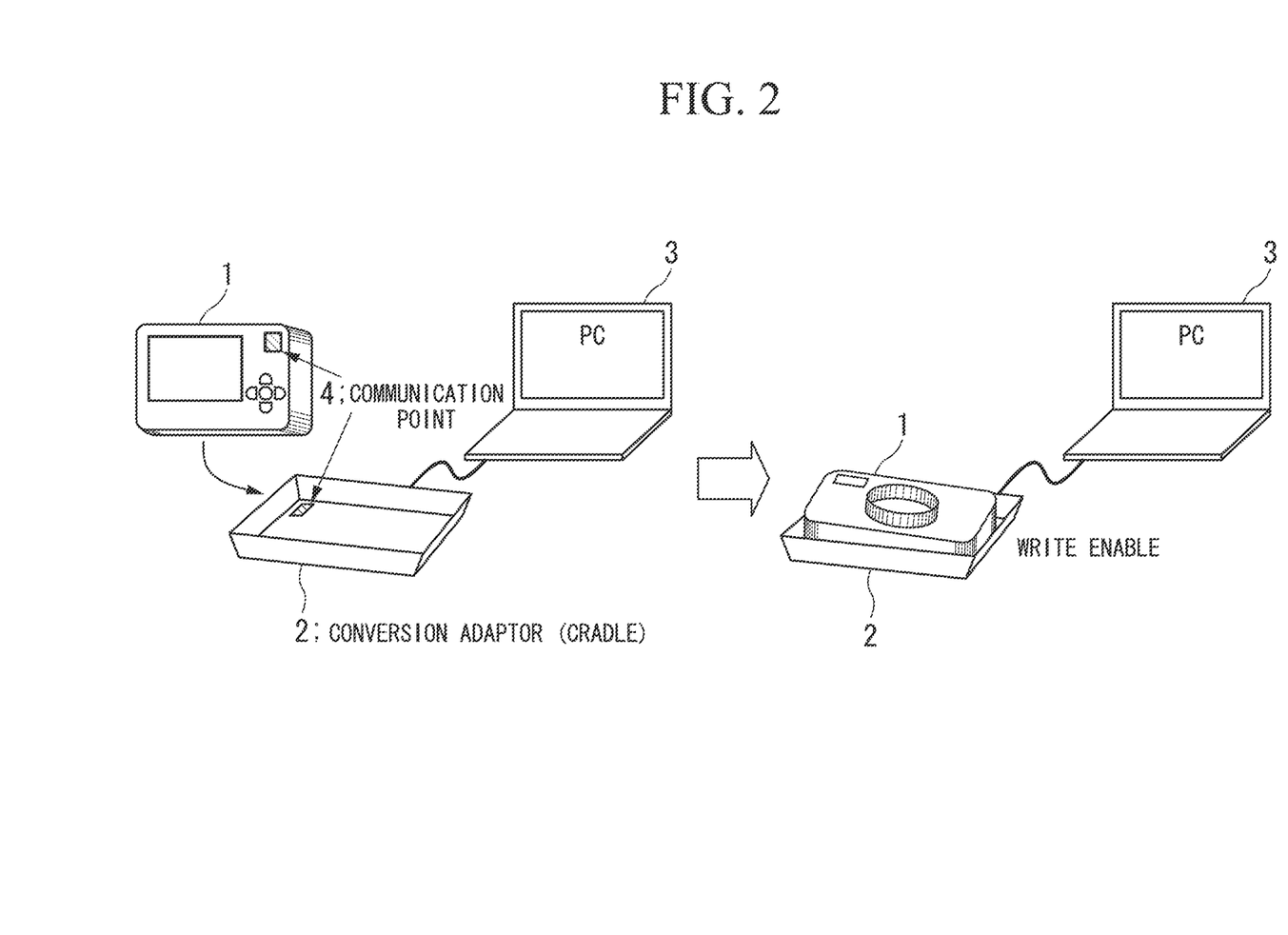
FIG. 2 is a schematic diagram showing an example of a connection when an electronic camera and a conversion adaptor perform wireless communication according to this embodiment.

FIG. 2 is a schematic diagram showing an example of a connection when the electronic camera 1 and a conversion adaptor 2 (cradle) perform wireless communication according to this embodiment. In the shown example, each of the electronic camera 1 and the conversion adaptor 2 has a communication point 4. By matching positions of the communication points 4 of the electronic camera 1 and the communication points 4 of the conversion adaptor 2 with each other, the electronic camera 1 and the conversion adaptor 2 can perform wireless communication using short-range wireless technology. Here, the electronic camera 1 and the conversion adaptor 2 perform wireless communication using short-range wireless technology. Thus, when the positions of the communication points 4 of the electronic camera 1 and the communication points 4 of the conversion adaptor 2 deviate from each other, wireless communication is cut off.

However, the conversion adaptor 2 of this embodiment is formed in a shape (such as a holder shape) that prevents the positions of the communication points 4 from deviating from each other when the electronic camera 1 is installed. Due to the shape, the electronic camera 1 is held in the conversion adaptor 2 without moving its position when the electronic camera 1 and the conversion adaptor 2 perform wireless communication. For this reason, the positions of the electronic camera 1 and the conversion adaptor 2 are not easily deviate from each other during wireless communication, and also the wireless communication is not easily be cut off. Thus, in this embodiment, in case that the positions of the electronic camera 1 and a wireless communication device of a communication destination are arranged such that they cannot easily deviate from each other as in the combination of the electronic camera 1 and the conversion adaptor 2, writing is permitted to the recording medium of the electronic camera 1.

The conversion adaptor 2 and the PC 3 are connected through a wire cable. The conversion adaptor 2 transmits data transmitted from the electronic camera 1 to the PC 3, and transmits data transmitted from the PC 3 to the electronic camera 1. In this way, data transmission and reception can be performed between the electronic camera 1 and the PC 3 via the conversion adaptor 2.

Figure 3:
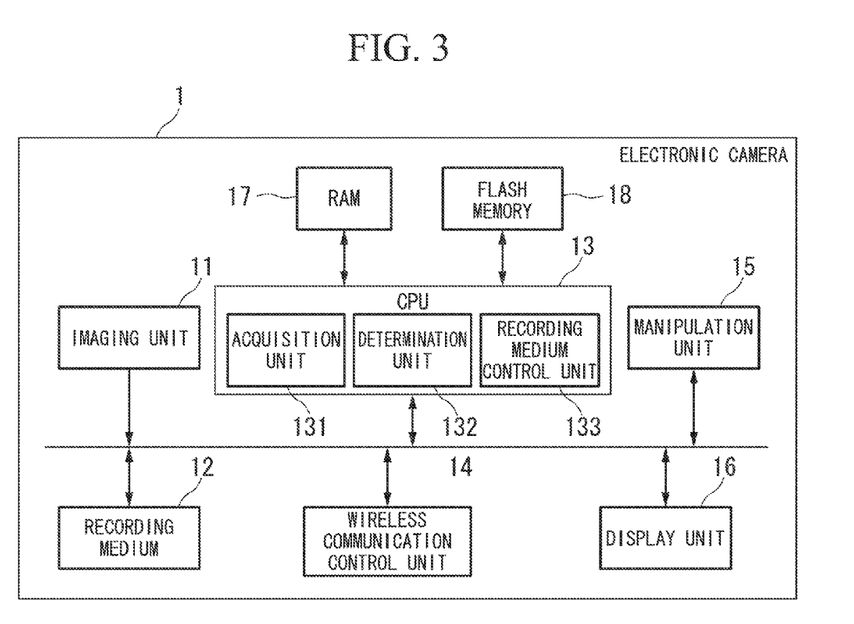
FIG. 3 is a block diagram showing a configuration of an electronic camera according to this embodiment.

Next, a configuration of the electronic camera 1 will be described. FIG. 3 is a block diagram showing a configuration of the electronic camera 1 according to this embodiment. In the shown example, the electronic camera 1 includes an imaging unit 11, a recording medium 12, a central processing unit (CPU) 13, a wireless communication control unit 14 (communication interface), a manipulation unit 15, a display unit 16, a random access memory (RAM) 17, and a flash memory 18 (storage unit).

The CPU 13 reads out and executes a control program stored in the flash memory 18, and reads and writes a variety of data from and to the RAM 17, thereby controlling operation of the respective units of the electronic camera 1 overall. In addition to a control program, the flash memory 18 stores writing identification information uniquely specifying a wireless communication device of which writing to the recording medium 12 is permitted. Also, the flash memory 18 stores a photographing parameter, a communication parameter (data communication protocol information and the like), and the like. The CPU 13 includes an acquisition unit 131, a determination unit 132, and a recording medium control unit 133. The acquisition unit 131 acquires identification information, which uniquely identifies a communication device of a communication counterpart, from a communication packet received by the wireless communication control unit 14. The determination unit 132 determines permission or prohibition of writing to the recording medium 12 on the basis of the writing identification information stored in the flash memory 18 and the identification information acquired by the acquisition unit 131. The recording medium control unit 133 performs control, such as reading out data from the recording medium 12, writing data to the recording medium 12, and permission or prohibition of data writing to the recording medium 12, on the basis of the determination result of permission or prohibition of writing to the recording medium 12 determined by the determination unit 132.

The imaging unit 11 photographs a subject to generate an imaging signal, and performs various kinds of image processes to create image data. The image data created by the imaging unit 11 is recorded in the recording medium 12. As the recording medium 12, for example, a memory card that can be attached to and detached from the electronic camera 1, a hard disk fixed to the electronic camera 1, or the like is used. Also, the recording medium 12 stores data transmitted from another device, such as the conversion adaptor 2, by control of the recording medium control unit 133.

The manipulation unit 15 includes a manipulation switch for inputting an instruction on operation of the electronic camera 1, and the like. The display unit 16 displays image data read out from the recording medium 12, a user interface screen, and the like. The wireless communication control unit 14 is a wireless communication interface that exchanges data, such as a photographed image, between an external device, such as the PC 3, a printer and an external recording device, and the conversion adaptor 2. A wireless communication interface denotes an interface widely used for information transmission and reception. Wireless communication interfaces also include wireless communication, for example, a Wireless LAN (WLAN), Bluetooth (registered trademark), IrDA (registered trademark), TransferJET (registered trademark), WiMedia (registered trademark), and the like.

Figure 4:
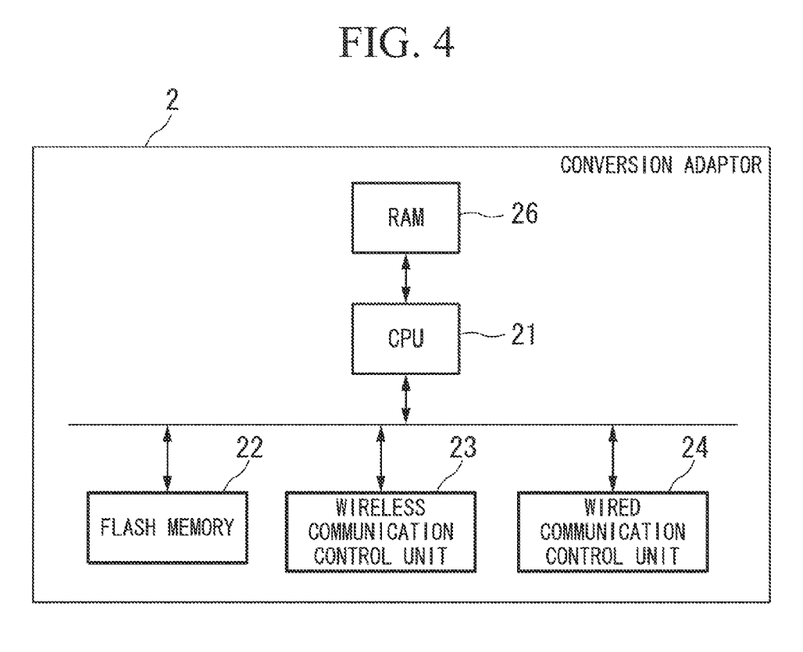
FIG. 4 is a block diagram showing a configuration of a conversion adaptor according to this embodiment.

Next, a configuration of the conversion adaptor 2 will be described. FIG. 4 is a block diagram showing a configuration of the conversion adaptor 2 according to this embodiment. In the shown example, the conversion adaptor 2 includes a CPU 21, a flash memory 22, a wireless communication control unit 23, and a wired communication control unit 24.

The CPU 21 reads out and executes a control program stored in the flash memory 22, and reads and writes a variety of data from and to a RAM 26. In this way, the CPU 21 controls operation of the respective units of the conversion adaptor 2 overall.

The wireless communication control unit 23 is a wireless communication interface that transmits and receives a variety of data with a device such as the electronic camera 1, or the like. A wireless communication interface denotes an interface widely used for information transmission and reception. Wireless communication interfaces also include wireless communication, for example, a WLAN, Bluetooth (registered trademark), IrDA (registered trademark), TransferJET (registered trademark), WiMedia (registered trademark), and the like. The wired communication control unit 24 is a wired communication interface that transmits and receives data of the imaging device 1 and the like with the PC 3, a printer, or the like. A wired communication interface is, for example, the universal serial bus (USB), and the like.

Figure 5:
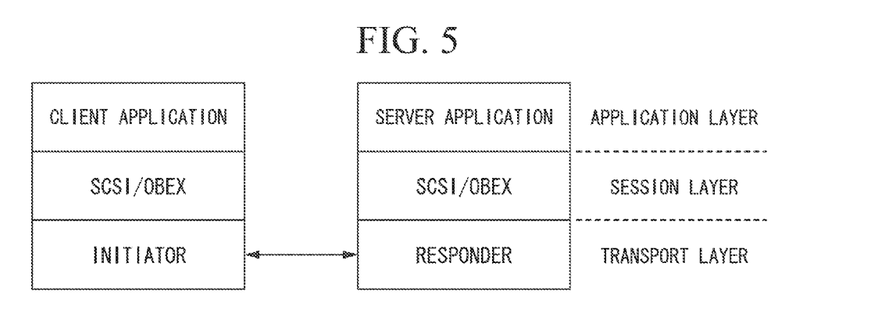
FIG. 5 is a hierarchy diagram showing layers of communication protocols used by a wireless communication control unit of an electronic camera and a wireless communication control unit of a conversion adaptor according to this embodiment.

Next, a communication protocol used by the wireless communication control unit 14 of the electronic camera 1 and the wireless communication control unit 23 of the conversion adaptor 2 will be described. FIG. 5 is a hierarchy diagram showing layers of communication protocols used by the wireless communication control unit 14 of the electronic camera 1 and the wireless communication control unit 23 of the conversion adaptor 2 and the PC 3 according to this embodiment.

The transport layer of a communication method used in this embodiment is for short-range wireless communication having a short communication range. The transport layer employs a communication method in which Initiator/Responder roles are given to devices, the Initiator performs connection request, and the Responder receives (accepts) the connection request. In this embodiment, the conversion adaptor 2 and the PC 3 are Initiators, and the electronic camera 1 is a Responder. Also, the devices (the conversion adaptor 2 and the PC 3) of the Initiator side controls start/stop of service of the application layer and/or a protocol (OBject EXchange (OBEX)/SCSI and the like) of the session layer.

In the communication method of this embodiment, exchange of device information, start/stop of service, or the like is performed by transmits and receives the following messages in the transport layer. The messages include a Request Message and a Response Message. The request message is a message issued from an Initiator to a Responder. The response message is a message sent from a Responder to an Initiator as a response.

Figure 6:
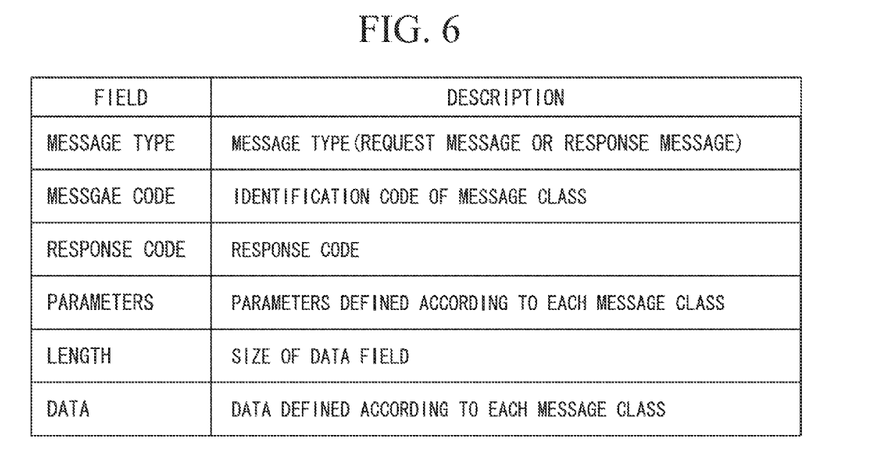
FIG. 6 is a schematic diagram showing a format of a message according to this embodiment.

Next, a format of a message according to this embodiment will be described. FIG. 6 is a schematic diagram showing a format of a message according to this embodiment. In this embodiment, a message has Message Type, Message Code, Response Code, Parameters, Length, and Data as fields.

The field of Message Type stores a message type (Request Message/Response Message). The field of Message Code stores a code for identifying a message class. Message classes in this embodiment are "Get Device Information," "Get Service List," and "Set Service."

The field of Response Code stores a response code (process result) to a request message. For example, in the case of a normal end, a code indicating SUCCESS is stored in the field of Response Code.

Also, the field of Response Code becomes valid only when a Message Type is a Response Message.

The field of Parameters stores values defined according to each message class. The field of Length stores a size of the following Data field.

The field of Data stores data defined according to each message class.

Figure 7:
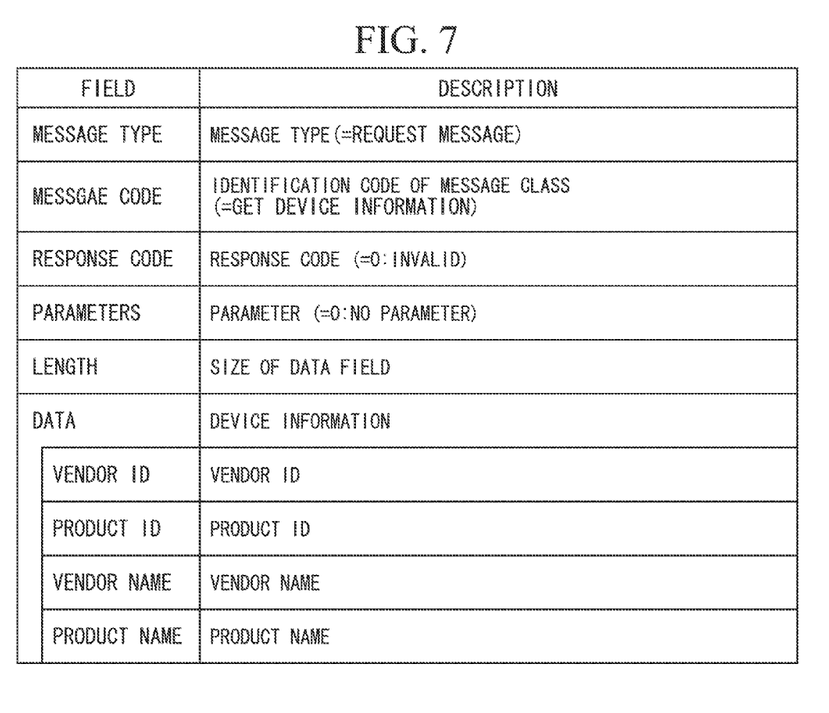
FIG. 7 is a schematic diagram showing a format of a device information acquisition request message according to this embodiment.

Next, a format of a device information acquisition request message will be described. FIG. 7 is a schematic diagram showing a format of a device information acquisition request message according to this embodiment. The device information acquisition request message is a message for acquiring device information of a Responder and also for notification of the device information. The device information acquisition request message is transmitted from an Initiator to the Responder.

In a field of Message Type of the device information acquisition request message, a message type "Request Message" is stored. In a field of Message Code, a code "Get Device Information" for identifying a message class is stored. In a field of Response Code, a response code "0: Invalid" is stored. In a field of Parameters, a value "0: No Parameter" defined according to each message class is stored. In a field of Length, a size of a Data field is stored. The field of Data includes "Vendor ID," "Product ID," "Vendor Name" and "Product Name" fields that stores data defined according to each message class. In the Vendor Identifier (ID) field, a vendor ID for identifying a manufacturer of a device is stored. In the Product ID field, a product ID for identifying the device according to each manufacturer is stored. In the Vendor Name field, text (letters) indicating a manufacturer name of the device is stored. In the Product Name field, text (letters) indicating a product name of the device is stored.

Figure 8:
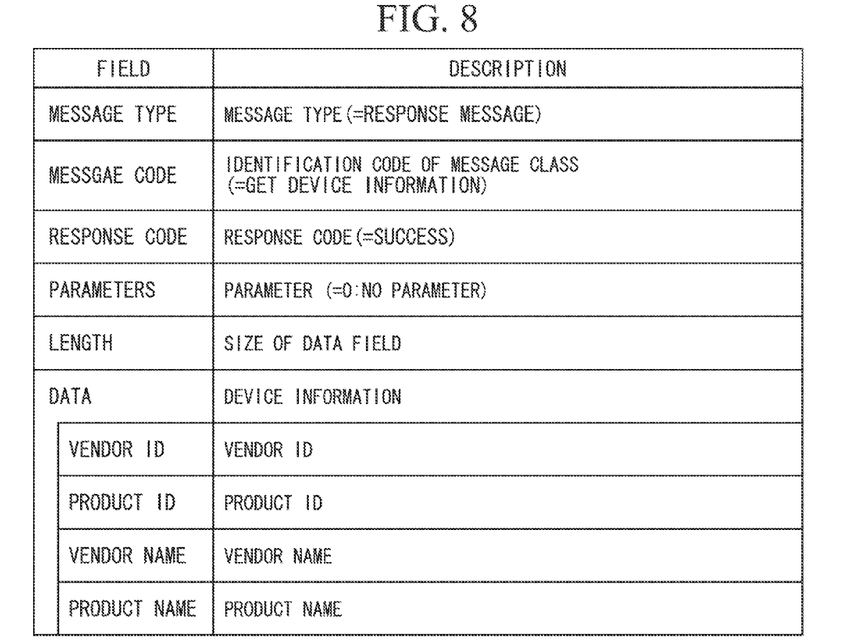
FIG. 8 is a schematic diagram showing the format of a device information acquisition response message according to this embodiment.

Next, a format of a device information acquisition response message will be described. FIG. 8 is a schematic diagram showing a format of a device information acquisition response message according to this embodiment. The device information acquisition response message is a message for sending device information of a Responder as a response. The device information acquisition response message is transmitted from the Responder to an Initiator.

In a field of Message Type of the device information acquisition response message, a message type "Response Message" is stored. In a field of Message Code, a code "Get Device Information" for identifying a message class is stored. In a field of Response Code, a response code "SUCCESS" is stored. In a field of Parameters, a value "0: No Parameter" defined according to each message class is stored. In a field of Length, a size of a Data field is stored. The field of Data includes "Vendor ID," "Product ID," "Vendor Name" and "Product Name" fields that store data defined according to each message class. In the Vendor ID field, a vendor ID for identifying a manufacturer of a device is stored. In the Product ID field, a product ID for identifying the device according to each manufacturer is stored. In the Vendor Name field, text (letters) indicating a manufacturer name of the device is stored. In the Product Name field, text (letters) indicating a product name of the device is stored.

Figure 9:
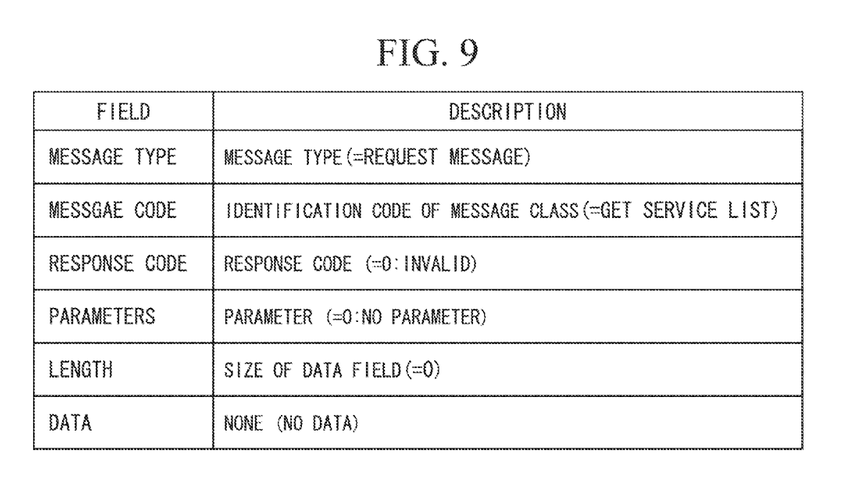
FIG. 9 is a schematic diagram showing a format of a service list acquisition request message according to this embodiment.

Next, a format of a service list acquisition request message will be described. FIG. 9 is a schematic diagram showing a format of a service list acquisition request message according to this embodiment. The service list acquisition request message is a message for acquiring a list of services and/or protocols corresponding to a Responder. The service list acquisition request message is transmitted from an Initiator to the Responder.

In a field of Message Type of the service list acquisition request message, a message type "Request Message" is stored. In a field of Message Code, a code "Get Service List" for identifying a message class is stored. In a field of Response Code, a response code "0: Invalid" is stored. In a field of Parameters, a value "0: No Parameter" defined according to each message class is stored. In a field of Length, a size "0" of a Data field is stored. In the field of Data, nothing is stored (None, No Data).

Figure 10:
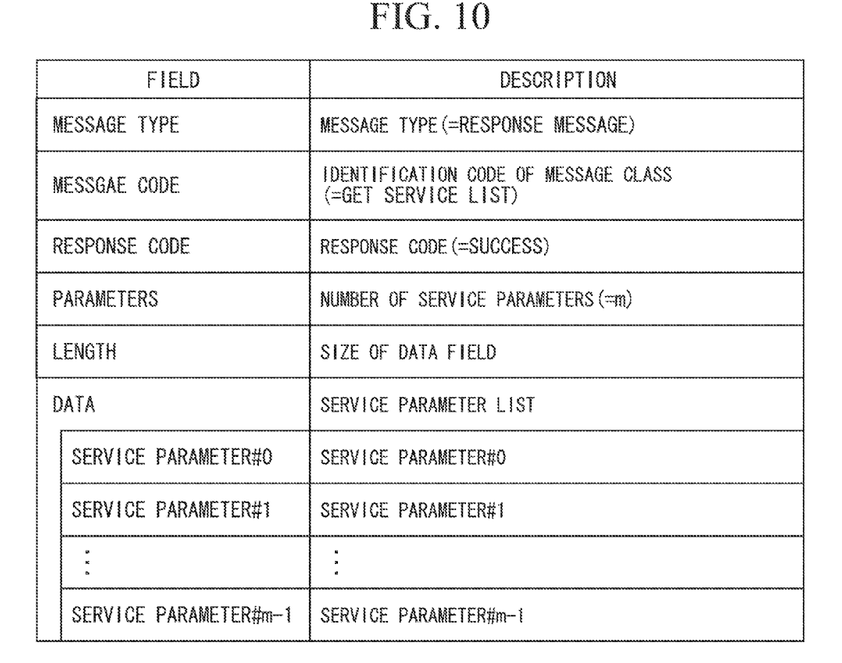
FIG. 10 is a schematic diagram showing the format of a service list acquisition response message according to this embodiment.

Next, a format of a service list acquisition response message will be described. FIG. 10 is a schematic diagram showing a format of a service list acquisition response message according to this embodiment. The service list acquisition response message is a message for sending a list of services and/or protocols corresponding to a Responder in response to a service list acquisition request message. The service list acquisition response message is transmitted from the Responder to an Initiator.

In a field of Message Type of the service list acquisition response message, a message type "Response Message" is stored. In a field of Message Code, a code "Get Service List" for identifying a message class is stored. In a field of Response Code, a response code "SUCCESS" is stored. In a field of Parameters, the number of service parameters "m" is stored. In a field of Length, a size of a Data field is stored. The field of Data includes "Service Parameter #0" to "Service Parameter #m-1" fields that store data defined according to each message class. In "Service Parameter #0" to "Service Parameter #m-1" fields, parameters relating to a service or a protocol are stored.

Figure 11:
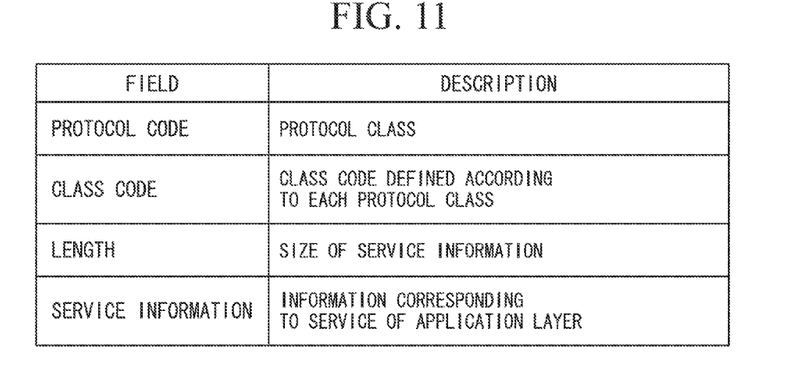
FIG. 11 is a schematic diagram showing a format of a Service Parameter according to this embodiment.

Next, a format of a service parameter will be described. FIG. 11 is a schematic diagram showing a format of a Service Parameter according to this embodiment. The Service Parameter in this embodiment includes a field of Protocol Code, a field of Class Code, a field of Length, and a field of Service Information.

The field of Protocol Code stores a code indicating a protocol class (OBEX/SCSI and the like). The field of Class Code stores a class code defined according to each protocol class. For example, when a protocol class is OBEX (Object Exchange), the field of Class Code stores a code indicating "OBEX Push Server," "OBEX Push Client," or the like. Also, when the protocol class is SCSI, the field of Class Code stores a code indicating "SCSI Block Device—Target," "SCSI Block Device—Initiator," or the like. The field of Length stores a size of Service Information. The field of Service Information stores information corresponding to a service of the application layer.

Figure 12:
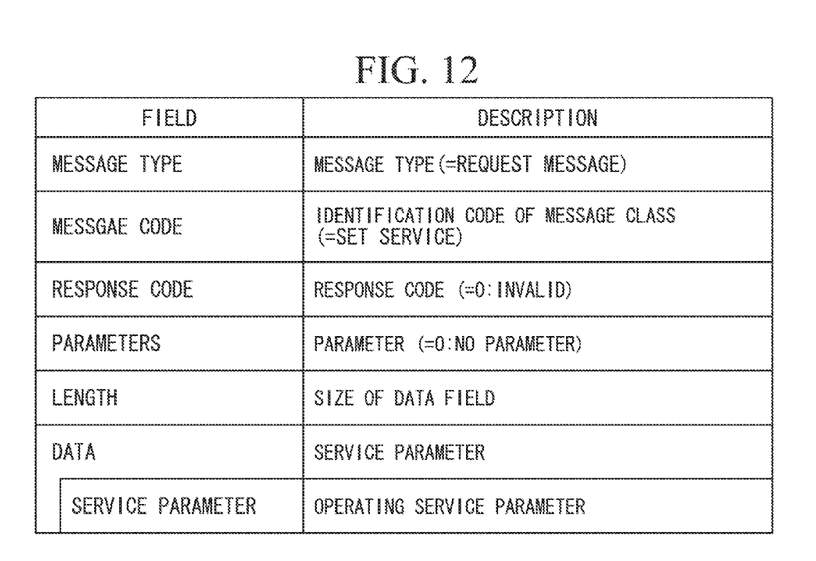
FIG. 12 is a schematic diagram showing a format of a service start/stop request message according to this embodiment.

Next, a format of a service start/stop request message will be described. FIG. 12 is a schematic diagram showing a format of a service start/stop request message according to this embodiment. The service start/stop request message is a message for requesting a Responder to start a service and/or a protocol or to stop a service and/or protocol that is currently in operation according to a designated Service Parameter. The service start/stop request message is transmitted from an Initiator to the Responder.

In a field of Message Type of the service start/stop request message, a message type "Request Message" is stored. In a field of Message Code, a code "Set Service" for identifying a message class is stored. In a field of Response Code, a response code "0: Invalid" is stored. In a field of Parameters, a value "0: No Parameter" defined according to each message class is stored. In a field of Length, a size of a Data field is stored. The field of Data includes a "Service Parameter" field that stores data defined according to each message class. In the field of Service Parameter, a running service parameter is stored. Also, a case in which a value stored in the field of Length is "0" (there is no Service Parameter) indicates a service stop request.

Figure 13:
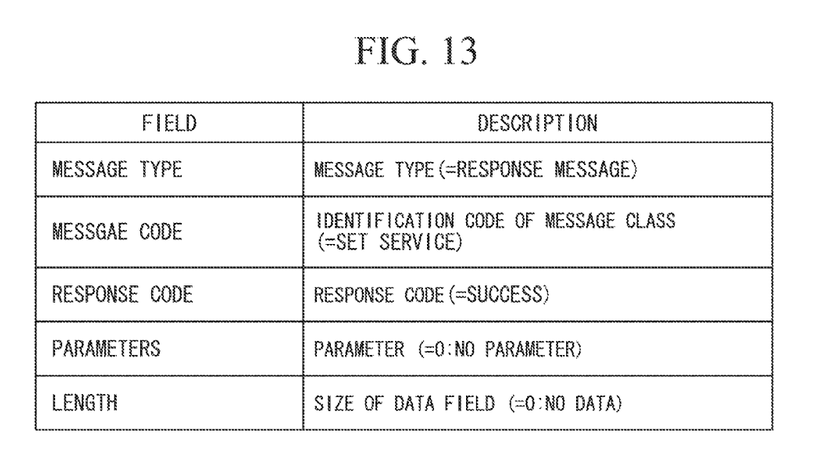
FIG. 13 is a schematic diagram showing the format of a service start/stop response message according to this embodiment.

Next, a format of a service start/stop response message will be described. FIG. 13 is a schematic diagram showing a format of a service start/stop response message according to this embodiment. The service start/stop response message is a response message to a service start/stop request message. The service start/stop response message is transmitted from a Responder to an Initiator.

In a field of Message Type of the service start/stop response message, a message type "Response Message" is stored. In a field of Message Code, a code "Set Service" for identifying a message class is stored. In a field of Response Code, a response code "SUCCESS" is stored. In a field of Parameters, a value "0: No Parameter" defined according to each message class is stored. In a field of Length, a size "0" of a Data field is stored.

Next, a method of permitting writing (write enable) to the recording medium 12 of the electronic camera 1 only when the electronic camera 1 is connected to a specific device such as the conversion adaptor 2, of which a position of the communication point 4 does not easily deviate from each other, and prohibiting writing (write protect) in other cases according to this embodiment will be described. In general, the conversion adaptor 2 is connected to the PC 3, and the electronic camera 1 is installed in the conversion adaptor 2 (to place the communication points 4 close together), so that wireless communication is started. Wired communication between the conversion adaptor 2 and the PC 3 is USB. Data transmitted and received by the wired communication control unit 24 of the conversion adaptor 2 is commands, data and statuses defined in the USB Mass Storage Class. The conversion adaptor 2 reciprocally converts the data between wireless communication and wired communication.

Figure 14:
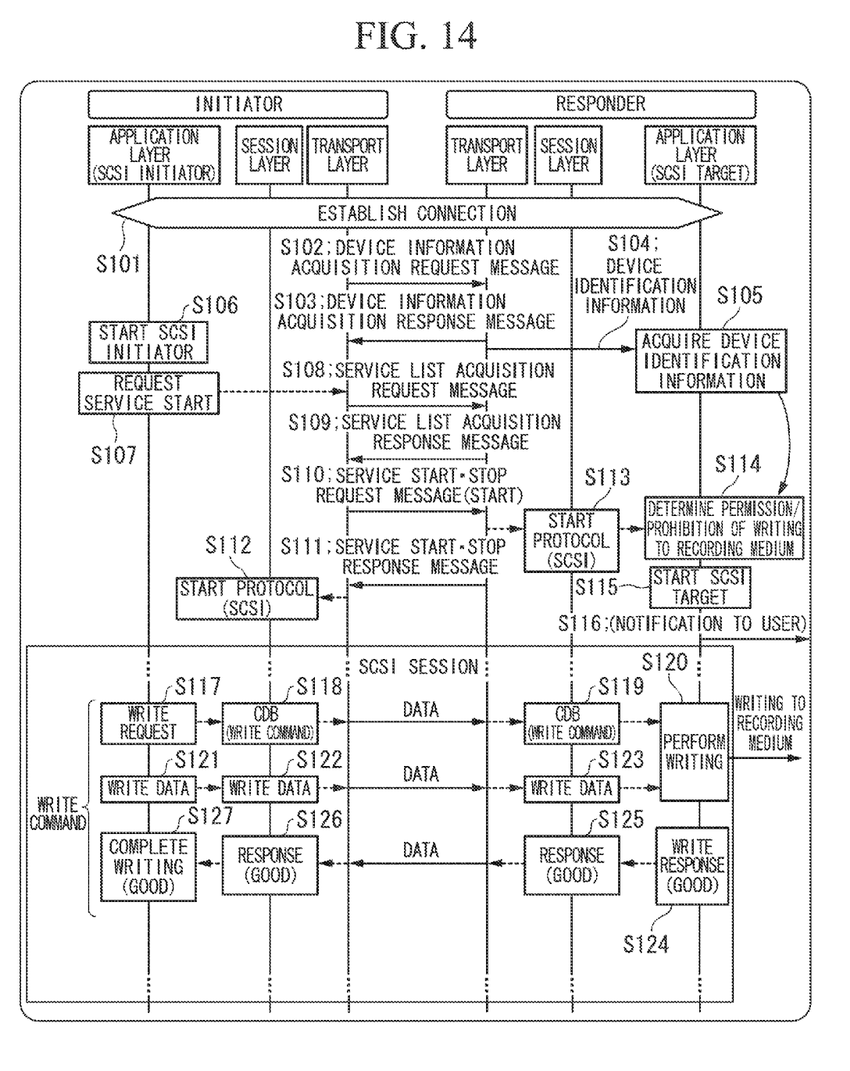
FIG. 14 is a sequence diagram showing an operation sequence from establishment of a connection to writing to a recording medium in wireless communication between an electronic camera and a conversion adaptor according to this embodiment.

FIG. 14 is a sequence diagram showing an operation sequence from establishment of a connection to writing to the recording medium 12 in wireless communication between the electronic camera 1 and the conversion adaptor 2 according to this embodiment. The conversion adaptor 2 is a device of which the position does not easily deviate from the position of the electronic camera 1. Thus, writing to the recording medium 12 of the electronic camera 1 is permitted by the determination unit 132. A sequence between the conversion adaptor 2 and the PC 3 is not directly related to wireless communication between the electronic camera 1 and the conversion adaptor 2, and thus is omitted.

In this embodiment, the electronic camera 1 (device in a Responder side) permits writing (write enable) to the recording medium 12 under the following conditions.

<Condition 1 for Write Enable>

Device identification information ("Vendor ID" and "Product ID") in a device information acquisition request message is identical to device identification information of the conversion adaptor 2.

A "Protocol Code" of a Service Parameter of a service start/stop(start) request message is SCSI, and a "Class Code" is an SCSI Block Device—Target.

<Condition 2 for Write Enable>

Device identification information ("Vendor Name" and "Product Name") in a device information acquisition request message is identical to device identification information on the conversion adaptor 2.

A "Protocol Code" of a service parameter of a service start/stop (start) request message is SCSI, and a "Class Code" is an SCSI Block Device—Target.

(Step S101) An Initiator (the conversion adaptor 2) and a Responder (the electronic camera 1) establish a communication connection. Specifically, the Initiator performs connection request to the Responder, and the Responder permits the connection request.

(Step S102) When a communication connection is established between the Initiator and the Responder, the Transport Layer of the Initiator transmits a device information acquisition request message including device identification information of the Initiator to the Transport Layer of the Responder.

(Step S103) The Transport Layer of the Responder transmits a device information acquisition response message to the Transport Layer of the Initiator.

(Step S104) The Transport Layer of the Responder acquires the device identification information from the device information acquisition request message received in the process of step S102, and inputs the device identification information to the Application Layer (SCSI Target) of the Responder.

(Step S105) The Application Layer (SCSI Target) of the Responder acquires the device identification information input in step S104.

(Step S106) The Application Layer (SCSI Target) of the Initiator starts an SCSI Initiator.

(Step S107) When the SCSI Initiator starts, the Application Layer (SCSI Target) of the Initiator requests the Transport Layer of the Initiator to start a service.

(Step S108) The Transport Layer of the Initiator that is requested to start the service transmits a service list acquisition request message to the Transport Layer of the Responder.

(Step S109) The Transport Layer of the Responder that receives the service list request message transmits a service list response message, in which a service corresponding to the electronic camera is set in a Service Parameter, to the Transport Layer of the Initiator.

(Step S110) The Transport Layer of the Initiator that receives the service list response message transmits a service start/stop request message (start) to the Transport Layer of the Responder. The Transport Layer of the Responder that receives the service start/stop request message (start) requests the Session Layer of the Responder to start an SCSI protocol.

(Step S111) The Transport Layer of the Responder that requests the Session Layer of the Responder to start the SCSI protocol transmits a service start/stop response message to the Transport Layer of the Initiator. The Transport Layer of the Initiator that receives the service start/stop response message requests the Session Layer of the Initiator to start an SCSI protocol.

(Step S112) The Session Layer of the Initiator that is requested to start the SCSI protocol starts the SCSI protocol.

(Step S113) The Session Layer of the Responder that is requested to start the SCSI protocol starts the SCSI protocol, and requests the Application Layer of the Responder to start the SCSI Target.

(Step S114) The Application Layer (SCSI Target) of the Responder that is requested to start the SCSI Target determines permission/prohibition of writing to the recording medium 12 on the basis of the device identification information acquired in the process of step S105 and writing identification information stored in the flash memory 18. In this example, assuming that the device identification information acquired in the process of step S105 is identical to the writing identification information stored in the flash memory 18, permission of writing to the recording medium 12 is determined. The condition for determining permission/prohibition of writing to the recording medium 12 is as described above.

(Step S115) The Application Layer (SCSI Target) of the Responder starts the SCSI Target.

(Step S116) The Responder inform the permission of writing to the recording medium 12 determined in step S114 to a user.

(Step S117) After the Session Layer of the Initiator starts the SCSI protocol, the Application Layer of the Initiator inputs a Write Request to the Session Layer of the Initiator in order to write data to a disk and the like of the SCSI Target.

(Step S118) The Session Layer of the Initiator to which the Write Request is input generates a Command Descriptor Block (CDB) including a Write Command. In succession, the Session Layer of the Initiator transmits the generated CDB to the Session Layer of the Responder through the Transport Layers of the Initiator and the Responder.

(Step S119) The Session Layer of the Responder acquires the Write Command from the received CDB. In succession, the Session Layer of the Responder inputs the acquired Write Command to the Application Layer (SCSI Target) of the Responder.

(Step S120) The Application Layer (SCSI Target) of the Responder to which the Write Command is input executes writing of Write Data transmitted from the Initiator in the process of step S121 to step S123. In other words, the data is written to the recording medium 12 of the electronic camera 1.

(Step S121) The Application Layer (SCSI Initiator) of the Initiator inputs the Write Data to the Session Layer of the Initiator. Here, the Write Data is a data written to the recording medium 12 of the electronic camera 1.

(Step S122) The Session Layer of the Initiator transmits the Write Data to the Session Layer of the Responder through the Transport Layers of the Initiator and the Responder.

(Step S123) The Session Layer of the Responder inputs the received Write Data to the Application Layer (SCSI Target) of the Responder. As described above, the Application Layer (SCSI Target) of the Responder executes writing of the input Write Data. In other words, the data is written to the recording medium 12 of the electronic camera 1.

(Step S124) After writing is finished, the Application Layer (SCSI Target) of the Responder inputs a Write Response (GOOD) to the Session Layer of the Responder to notify the Session Layer of the Responder that writing has been completed (successful).

(Step S125) The Session Layer of the Responder transmits the input Write Response (GOOD) to the Session Layer of the Initiator through the Transport Layers of the Responder and the Initiator.

(Step S126) The Session Layer of the Initiator inputs the received Write Response (GOOD) to the Application Layer of the Initiator.

(Step S127) The Application Layer (SCSI Initiator) of the Initiator to which the Write Response (GOOD) is input completes writing.

As described above, the Application Layer (SCSI Target) of the Responder (the electronic camera 1) acquires device identification information that uniquely specifies the Initiator from the Initiator (the conversion adaptor 2). In this embodiment, the acquisition unit 131 installed in the CPU 13 of the electronic camera 1 performs the process of acquiring the device identification information.

The Application Layer (SCSI Target) of the Responder (the electronic camera 1) determines permission/prohibition of writing to the recording medium 12 on the basis of the acquired device identification information and the writing identification information stored in the flash memory 18.

Also, in this embodiment, the determination unit 132 that the CPU 13 of the electronic camera 1 has executes the process of determining permission/prohibition of writing to the recording medium 12. Specifically, the flash memory 18 stores the writing identification information that specifies devices of which positions do not easily deviate from the position of the electronic camera 1. For this reason, when a device specified in the device identification information acquired by the acquisition unit 131 is included in the devices specified in the writing identification information, the determination unit 132 determines permission of writing to the recording medium 12.

If the electronic camera 1 receives a Write Command is transmitted from the conversion adaptor 2, the electronic camera 1 writes write object data (Write Data) that is received thereafter to the recording medium 12. After writing is finished, the electronic camera 1 transmits "GOOD" to the conversion adaptor 2 as a Response. As a result, the conversion adaptor 2 recognizes that writing to the recording medium 12 of the electronic camera 1 has been finished normally.

Figure 15:
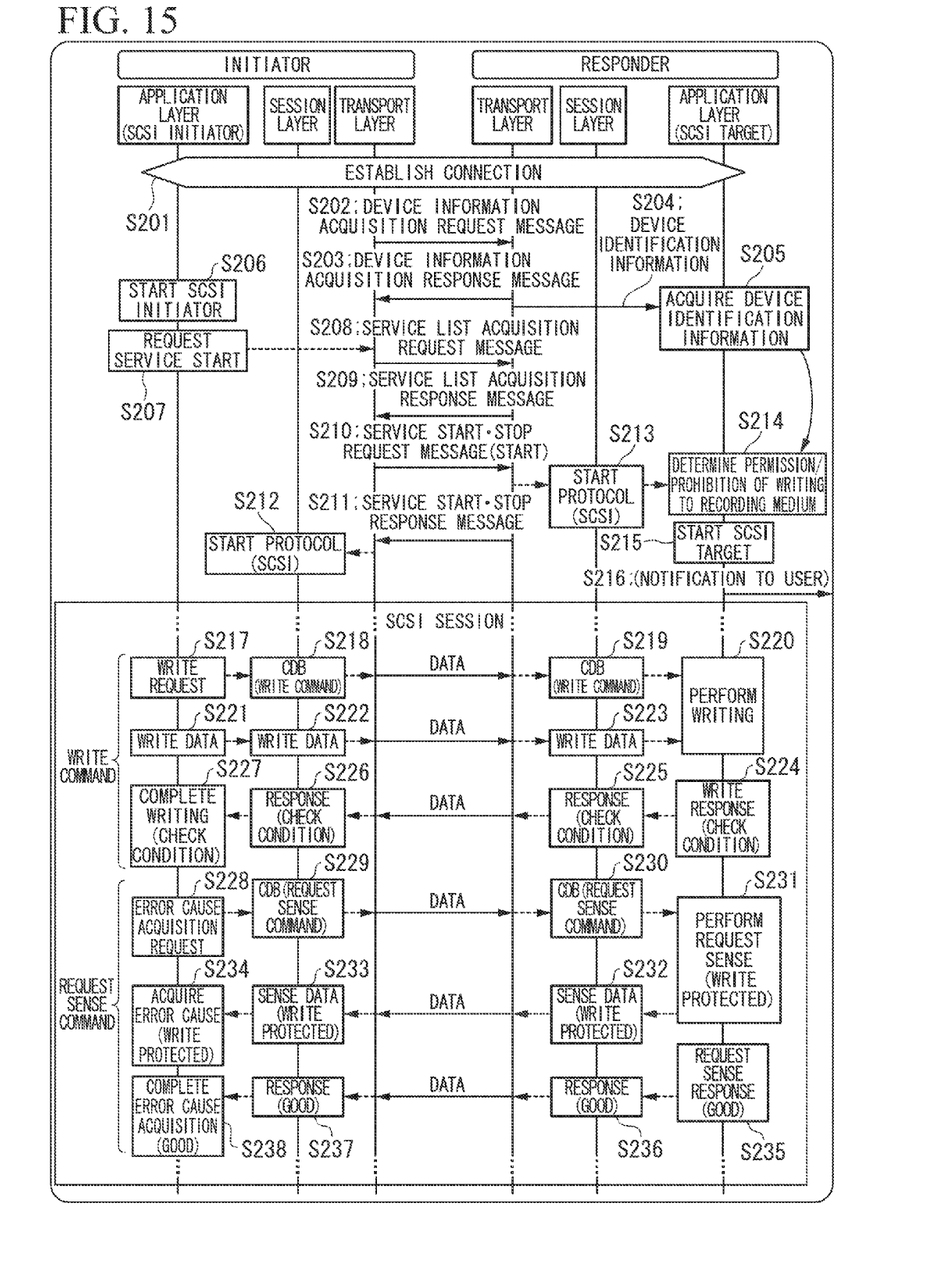
FIG. 15 is a sequence diagram showing an operation sequence from establishment of a connection to prohibition of writing to a recording medium in wireless communication between an electronic camera and a PC according to this embodiment.

FIG. 15 is a sequence diagram showing an operation sequence from establishment of a connection to prohibition of writing to the recording medium 12 in wireless communication between the electronic camera 1 and the PC 3 according to this embodiment. The PC 3 is a device of which a position easily deviates from the position of the electronic camera 1. For this reason, the determination unit 132 prohibits writing to the recording medium 12 of the electronic camera 1. The condition for the electronic camera 1 (device in the Responder side) to permit writing (write enable) to the recording medium 12 is as described above, and writing is prohibited when the condition is not satisfied.

(Step S201) The Initiator (the PC 3) and the Responder (the electronic camera 1) establish a communication connection. Specifically, the Initiator performs connection request to the Responder, and the Responder accepts the connection request.

The process of step S202 to step S213 is similar to that of step S102 to step S113 shown in FIG. 14.

(Step S214) The Application Layer (SCSI Target) of the Responder that is requested to start the SCSI Target determines permission/prohibition of writing to the recording medium 12 on the basis of the device identification information acquired in the process of step S205 and the writing identification information stored in the flash memory 18. In this example, assuming that the device identification information acquired in the process of step S205 is not identical to the writing identification information stored in the flash memory 18, prohibition of writing to the recording medium 12 is determined. The condition for determining permission/prohibition of writing to the recording medium 12 is as described above.

(Step S215) The Application Layer (SCSI Target) of the Responder starts the SCSI Target.

(Step S216) The Responder inform the prohibition of writing to the recording medium 12 determined in step S214 to a user.

The process of step S217 to step S219 is similar to that of step S117 to step S119 shown in FIG. 14.

(Step S220) The Application Layer (SCSI Target) of the Responder to which the Write Command is input executes writing of Write Data transmitted from the Initiator in the process of step S221 to step S223. However, writing to the recording medium 12 is prohibited in the process of step S214, and the data cannot be written to the recording medium 12 of the electronic camera 1.

The process of step S221 to step S223 is similar to that of step S121 to step S123 shown in FIG. 14.

(Step S224) Since writing to the recording medium 12 is prohibited as described above, the Application Layer (SCSI Target) of the Responder executes writing of the input Write Data, but cannot write the data to the recording medium 12 of the electronic camera 1. Thus, in order to notify the Session Layer of the Responder that writing has not been finished normally, the Application Layer (SCSI Target) of the Responder inputs a Write Response (Check Condition) to the Session Layer of the Responder.

(Step S225) The Session Layer of the Responder transmits the input Write Response (Check Condition) to the Session Layer of the Initiator through the Transport Layers of the Responder and the Initiator.

(Step S226) The Session Layer of the Initiator inputs the received Write Response (Check Condition) to the Application Layer of the Initiator.

(Step S227) The Application Layer (SCSI Initiator) of the Initiator to which the Write Response (Check Condition) is input completes writing.

(Step S228) The Application Layer (SCSI Initiator) of the Initiator to which the Write Response (Check Condition) is input inputs a Request Sense Command to the Session Layer of the Initiator (starts an error reason acquisition request process) in order to inquire about a reason that writing has not been finished normally.

(Step S229) The Session Layer of the Initiator to which the Request Sense Command is input generates a CDB (Command Descriptor Block) including the Request Sense Command. In succession, the Session Layer of the Initiator transmits the generated CDB to the Session Layer of the Responder through the Transport Layers of the Initiator and the Responder.

(Step S230) The Session Layer of the Responder acquires the Request Sense Command from the received CDB. In succession, the Session Layer of the Responder inputs the acquired Request Sense Command to the Application Layer (SCSI Target) of the Responder.

(Step S231) The Application Layer (SCSI Target) of the Responder to which the Request Sense Command is input executes Request Sense and acquires an error reason "Write Protected." In succession, the Application Layer (SCSI Target) of the Responder inputs Sense Data (Write Protected) containing the error cause to the Session Layer of the Responder.

(Step S232) The Session Layer of the Responder transmits the input Sense Data (Write Protected) to the Session Layer of the Initiator through the Transport Layers of the Responder and the Initiator.

(Step S233) The Session Layer of the Initiator inputs the received Sense Data (Write Protected) to the Application Layer of the Initiator.

(Step S234) The Application Layer (SCSI Initiator) of the Initiator to which the Sense Data (Write Protected) is input acquires the error cause "Write Protected." In this way, the Application Layer (SCSI Initiator) of the Initiator recognizes that writing to the recording medium 12 of the electronic camera 1 is prohibited.

(Step S235) The Application Layer (SCSI Target) of the Responder inputs a Request Sense Response (GOOD) to the Session Layer of the Responder.

(Step S236) The Session Layer of the Responder transmits the input Response (GOOD) to the Session Layer of the Initiator through the Transport Layers of the Responder and the Initiator.

(Step S237) The Session Layer of the Initiator inputs the received Response (GOOD) to the Application Layer of the Initiator.

(Step S238) The Application Layer (SCSI Initiator) of the Initiator to which the Response (GOOD) is input finishes the error cause acquisition request process.

As described above, the Application Layer (SCSI Target) of a Responder (the electronic camera 1) acquires device identification information that uniquely specifies an Initiator from the Initiator (the PC 3). In this embodiment, the acquisition unit 131 which is provided with the CPU 13 of the electronic camera 1 executes a process of acquiring device identification information. Then, the Application Layer (SCSI Target) of the Responder (the electronic camera 1) determines permission/prohibition of writing to the recording medium 12 on the basis of the acquired device identification information and writing identification information stored in the flash memory 18. In this embodiment, the determination unit 132 which is provided with the CPU 13 of the electronic camera 1 executes a process of determining permission/prohibition of writing to the recording medium 12. Specifically, the flash memory 18 stores the writing identification information that specifies devices of which positions do not easily deviate from the position of the electronic camera 1. Here, the determination unit 132 determines prohibition of writing to the recording medium 12 since a device (the PC 3) specified by the device identification information acquired by the acquisition unit 131 is not included in the devices specified by the writing identification information.

In addition, when a write command is received from the PC 3, the electronic camera 1 receives write object data (Write data) that is transmitted thereafter (or stops receiving Write Data) and then transmits "Check Condition" to the PC 3 as a Response. As a result, the PC 3 can recognize that writing to the recording medium 12 of the electronic camera 1 has not been finished normally. In succession, the PC 3 transmits a Request Sense Command to the electronic camera 1 in order to inquire about a reason that writing has not been finished normally (error cause). The electronic camera 1 transmits Sense Data, in which an error cause "Write Protected" is set, to the PC 3, and successively transmits a Response. As a result, the PC 3 recognizes that writing to the recording medium 12 of the electronic camera 1 is prohibited.

The conversion adaptor 2 and the PC 3 can also recognize whether or not writing to the recording medium 12 of the electronic camera 1 is prohibited, according to a WP bit among Mode Parameters acquired by executing a Mode Sense Command. Here, among the Mode Parameters, a WP bit of 0 indicates permission of writing, and a WP bit of 1 indicates prohibition of writing.

As described above, in this embodiment, the flash memory 18 stores writing identification information that uniquely specifies wireless communication devices of which permits writing to the recording medium 12. In this embodiment, in case of the conversion adaptor 2, it is permitted to write to the recording medium 12. For this reason, the flash memory 18 stores writing identification information that uniquely specifies the conversion adaptor 2. The acquisition unit 131 acquires device identification information that uniquely specifies wireless communication devices (the conversion adaptor 2 and the PC 3) from an arbitrary wireless communication device via the wireless communication control unit 14 (communication interface) until communication by a communication protocol of a higher layer level than a Transport Layer level is started after a connection with the arbitrary wireless communication device is established by a communication protocol of the Transport Layer level. The determination unit 132 determines permission or prohibition of writing to the recording medium 12 on the basis of the device identification information acquired by the acquisition unit 131 and the writing identification information stored in the flash memory 18 when a communication protocol (SCSI) of a session layer, which performs writing to and readout from the recording medium 12 in sector units, is selected by the communication protocol of the higher layer level. The recording medium control unit 133 controls permission and prohibition of writing to the recording medium 12 on the basis of a result determined by the determination unit 132.

Specifically, when the positions of the electronic camera 1 and a device of a communication destination easily deviate from each other as in the combination of the electronic camera 1 and the PC 3, it is possible to prohibit to write to the recording medium of the electronic camera 1. Also, when the positions of the electronic camera 1 and a device of a communication destination do not easily deviate from each other as in the combination of the electronic camera 1 and the conversion adaptor 2, writing is permitted to the recording medium of the electronic camera 1.

Consequently, even when wireless communication may be cut off while data is being written to the recording medium 12, the risk of data loss can be reduced without manipulation of a user.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A wireless communication device, comprising:
   a communication interface configured to communicate for short-range wireless communication with the wireless communication device;
   a recording medium configured to store data communicated for short-range wireless communication from the wireless communication device via the communication interface;

a storage unit configured to store writing identification information relating to permission and prohibition of writing to the recording medium;

a control unit configured to control so as to acquire device identification information to specify whether the wireless communication device is a target for permission of writing or a target for prohibition of writing from the wireless communication device via the communication interface in a state, in which a communication protocol of a session layer that is used with the wireless communication device and performs writing to the recording medium in sector units is not selected after a connection for short-range wireless communication with the wireless communication device is established by a communication protocol of a transport layer level, to determine permission or prohibition of writing to the recording medium based on the acquired device identification information and the writing identification information stored in the storage unit when the communication protocol of the session layer that is used with the wireless communication device and performs writing to the recording medium in the sector units is selected, to control permission and prohibition of writing to the recording medium before a communication protocol of an application layer corresponding to the selected communication protocol of the session layer starts, based on the determined result, and to perform data communication by the communication protocol of the application layer using short-range wireless communication with the wireless communication device in the controlled state.

2. The wireless communication device according to claim 1,
wherein the control unit acquires the device identification information via the data communication by the communication protocol of the transport layer using short-range wireless communication, and determines permission or prohibition of writing to the recording medium by the communication protocol of the application layer.

3. The wireless communication device according to claim 1,
wherein the communication protocol of the session layer that performs writing to and readout from the recording medium in sector units is an SCSI protocol.

4. The wireless communication device according to claim 1,
wherein the control unit notifies the wireless communication device of the determined result via the data communication by the communication protocol of the application layer using short-range wireless communication when receiving writing request from the wireless communication device.

5. A wireless communication method for a wireless communication device including a communication interface, a recording medium and a storage unit, the method comprising:
acquiring device identification information to specify whether the wireless communication device is a target for permission of writing or a target for prohibition of writing from the wireless communication device via the communication interface in a state, in which a communication protocol of a session layer that is used with the wireless communication device and performs writing to the recording medium in sector units is not selected after a connection for short-range wireless communication with the wireless communication device is established by a communication protocol of a transport layer level;

determining permission or prohibition of writing to the recording medium based on the acquired device identification information and a writing identification information stored in advance in the storage unit as information relating to permission or prohibition of writing to the recording medium when the communication protocol of the session layer that is used with the wireless communication device and performs writing to the recording medium in the sector units is selected;

controlling permission and prohibition of writing to the recording medium before a communication protocol of an application layer corresponding to the selected communication protocol of the session layer starts, based on the determined result; and performing data communication by the communication protocol of the application layer using short-range wireless communication with the wireless communication device in a state in which permission or prohibition of writing to the recording medium is controlled.

6. A non-transitory computer-readable storage device recording a program for causing a wireless communication device including a communication interface, a recording medium and a storage unit, to execute steps comprising:
acquiring device identification information to specify whether the wireless communication device is a target for permission of writing or a target for prohibition of writing from the wireless communication device via the communication interface in a state, in which a communication protocol of a session layer that is used with the wireless communication device and performs writing to the recording medium in sector units is not selected after a connection for short-range wireless communication with the wireless communication device is established by a communication protocol of a transport layer level;

determining permission or prohibition of writing to the recording medium based on the acquired device identification information and a writing identification information stored in advance in the storage unit as information relating to permission or prohibition of writing to the recording medium when the communication protocol of the session layer that is used with the wireless communication device and performs writing to the recording medium in the sector units is selected;

controlling permission and prohibition of writing to the recording medium before a communication protocol of an application layer corresponding to the selected communication protocol of the session layer starts, based on the determined result; and performing data communication by the communication protocol of the application layer using short-range wireless communication with the wireless communication device in a state in which permission or prohibition of writing to the recording medium is controlled.

* * * * *